US012310304B2

(12) United States Patent
Rollwa

(10) Patent No.: US 12,310,304 B2
(45) Date of Patent: May 27, 2025

(54) PLANT CARRIER

(71) Applicant: Jungheinrich Aktiengesellschaft, Hamburg (DE)

(72) Inventor: Volker Rollwa, Pirmasens (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 2 days.

(21) Appl. No.: 18/212,406

(22) Filed: Jun. 21, 2023

(65) Prior Publication Data

US 2023/0413739 A1   Dec. 28, 2023

(30) Foreign Application Priority Data

Jun. 22, 2022 (EP) ..................................... 22180540

(51) Int. Cl.
*A01G 9/02* (2018.01)

(52) U.S. Cl.
CPC ....................................... *A01G 9/02* (2013.01)

(58) Field of Classification Search
USPC ... 47/62 E, 82, 83, 79, 39, 59 R, 62 R, 62 C
See application file for complete search history.

(56) References Cited

U.S. PATENT DOCUMENTS

| 1,329,559 | A | 2/1920 | Tesla | |
| 6,243,985 | B1 * | 6/2001 | Miller | A01G 27/00 |
| | | | | 47/62 R |
| 10,010,034 | B2 * | 7/2018 | Zhan | A01G 31/02 |
| 10,299,449 | B2 * | 5/2019 | Wu | A01G 31/02 |
| 10,842,095 | B2 * | 11/2020 | Ivanescu | A01G 9/20 |
| 11,719,236 | B2 * | 8/2023 | Siebert | F16K 51/00 |
| | | | | 138/37 |
| 2013/0247462 | A1 * | 9/2013 | Leslie | A01G 9/247 |
| | | | | 47/82 |
| 2015/0282444 | A1 * | 10/2015 | Butler | A01G 31/06 |
| | | | | 47/62 C |
| 2017/0044868 | A1 * | 2/2017 | van Petegem | E21B 43/12 |
| 2022/0307617 | A1 * | 9/2022 | Cavelius | A01G 25/16 |

FOREIGN PATENT DOCUMENTS

| CN | 213719047 | * | 7/2021 | .............. A01G 9/28 |
| CN | 216722443 | | 6/2022 | |
| FR | 2 382 850 | | 10/1978 | |
| FR | 2 761 575 | | 10/1998 | |
| JP | H0240758 | * | 10/1990 | .............. A01G 31/00 |

OTHER PUBLICATIONS

Europe Extended Search Report conducted in Europe Appln. No. 22180540.1, dated Dec. 13, 2022.
Europe Office Action conducted in Europe Appln. No. 22180540.1 (Oct. 2, 2024).

* cited by examiner

*Primary Examiner* — Andrea M Valenti
(74) *Attorney, Agent, or Firm* — GREENBLUM & BERNSTEIN, P.L.C.

(57) ABSTRACT

A plant carrier includes an irrigation chamber, an inlet, and a drain which has a drain path arrangement. The drain path arrangement has a first drain path with a first flow direction and a second drain path with at least one outlet into the first drainage path and, in a region of the at least one outlet, a second flow direction of the second drain path has a directional component opposing first flow direction.

12 Claims, 3 Drawing Sheets

PLANT CARRIER

CROSS-REFERENCE TO RELATED APPLICATION

This application claims priority under 35 U.S.C. § 119(a) to Europe Application No. 22 18 0540.1 filed Jun. 22, 2022, the disclosure of which is expressly incorporated by reference herein in its entirety.

BACKGROUND

1. Field of the Invention

Embodiments relate to a plant carrier including an irrigation chamber, an inlet, and a drain which has a drain path arrangement.

2. Discussion of Background Information

Such a plant carrier is used in particular in the so-called "vertical farming", that is in a greenhouse arrangement, in which a plurality of plant carriers of this kind are arranged one above the other in the direction of gravity. A particularly preferable use here is the arrangement of the plant carriers in block storage, in which the plant carriers are stacked directly on top of one another.

In the plant carrier, seeds, seedlings, or young plants are used on a substrate or other underlayer. The plants, more precisely the roots of the plants, must be watered from time to time. In this case, it is often desirable for the roots of the plants to be wetted for a certain period of time, wherein the water can be drained again after this period has elapsed so that the roots come into contact with oxygen.

However, this intermittent watering requires relatively high control effort, which requires, among other things, valves which are arranged in the region of the drain in order to let the water drain out of the irrigation chamber or to keep it there.

SUMMARY

Embodiments provide a plant carrier which is suitable and simple for intermittent watering.

In embodiments, a plant carrier of the type mentioned at the outset in which the drain path arrangement has a first drain path with a first flow direction and a second drain path. The second drain path has at least one outlet into the first drain path and has, in the region of the outlet, a second flow direction with a directional component, which is directed counter to the first flow direction in the region of the outlet.

In the case of such a plant carrier, a valve is no longer required for con rolling the water during draining. The outflowing water flows both through the first drain path and through the second drain path. The water flowing through the second drain path then converges with the water flowing through the first drain path and, since the water from the second flow path has a directional component which is counter to the direction in which the water flows through the first drain path, the water flowing through the second drain path decelerates the water in the first drain path and thereby leads to a throttling of the flow of the water that altogether flows out of the irrigation chamber. However, this throttling is not achieved by small cross-sections in which there is the risk of clogging by plant residue, contamination particles, or the like, but is brought about by flows directed oppositely to one another. The dimensions of the drain paths can be selected to be so large that the risk of clogging by plant residue or the like can be minimized. In this case, the arrangement of the two flow paths corresponds to the structure of a Tesla valve, as is known, for example, from U.S. Pat. No. 1,329,559 A. This Tesla valve is operated in the "blocking direction". However, the current through the drain paths is not completely prevented, but only slowed down. If "water" is mentioned here and in the following, then not only is pure water specified but also any liquid with which nutrients and moisture can be transported to the plants accommodated in the plant carrier.

Preferably, the second drain path has at least five outlets in the first drain path. This results in five disturbance points at which the flow of the water flowing out through the first drain path is disturbed and decelerated. The more outlets that are present, the greater the throttling effect.

Preferably, the first drain path has at least one first section and a second section which are connected in series, wherein the first section and the second section are arranged next to one another. Between the first section and the second section, the outflowing water must therefore carry out a sweeping process by approximately 180°, which leads to further throttling and deceleration of the flow of the water flowing through the drain path arrangement. Of course, a second section of the second sequence path can also be connected in parallel with the second section of the first sequence path so that outlets of the second drain path into the first drain path also result in the second section. This further improves the throttling effect.

Preferably, the first drain path has an odd number of sections which are connected in series and arranged next to one another. This results in a meandering guidance of the first drain path with a correspondingly large number of deflections of the water that flows through the drain path arrangement. The "input" of the first drain path is in this case not at the same end as the "output". In all sections, outlets of the second drain path can be present, wherein, for all outlets, a flow in the first drain path impinges on an oppositely directed flow in the second drain path.

It is also preferable for the first outlet to have a drain opening that is connected to the drain path arrangement via a baffle plate device, wherein the baffle plate device has a baffle plate which is directed upward in the direction of gravity, the surface of which merges into a wall of a first channel, and for the drain path arrangement to be connected to a second channel via at least one opening of the baffle plate arrangement, and for the first channel and the second channel to lead into or extend through the drain opening. If a plurality of plant carriers are arranged one above the other, the water flowing out of a plant carrier arranged higher in the direction of gravity must flow through one or more plant carriers arranged further down and, if it is to be avoided that the outflowing water, which is consumed in some way, flows through the irrigation chamber of the plant carrier or the plant carrier arranged further down, it must be ensured that the water flowing out of the upper plant carrier can flow out through the drain of a plant carrier arranged further down. In order to avoid an excessively large fall height of the outflowing water, the baffle plate is provided, onto which the water flowing out of an upper plant carrier exits. The water is then guided from the baffle plate into the drain opening through a first channel. The water flowing out of the plant carrier which is equipped with said baffle plate device then flows into the second channel. The water from the upper and the lower plant carriers is then only mixed in the baffle plate device or even downstream thereof. This makes it possible to avoid water flowing out of the upper plant carrier from entering the irrigation chamber of the lower plant carrier.

The baffle plate device is preferably oriented along the direction of gravity with the drain opening. This has advantages in particular when the plant carriers are designed to be stackable. In this case, the baffle plate device is located, in the direction of gravity, below the drainage opening of a plant carrier arranged there above. In this case, more than two plant carriers can also be arranged one above the other in the direction of gravity, without a falling height being produced.

In this case, it is preferable for the baffle plate device to be connected to a pipe directed upward in the direction of gravity. The water can then flow downward through said pipe out of the plant carrier arranged further upward in the direction of gravity and is reliably guided onto the baffle plate of the baffle plate arrangement.

A third drain path is preferably provided which is connected to the irrigation chamber via an overflow. This embodiment also greatly simplifies the control of the inlet of the water. Water can be supplied with a volume which significantly exceeds the volume necessary for filling the irrigation chamber. The water then accumulates in the irrigation chamber until it can flow out via the overflow. The overflow thus defines the fill level of the water in the irrigation chamber. Since the overflow does not counteract the outflowing water with practically any flow resistance and the third drain path is arranged in parallel with the second drain path, the water is not throttled or is throttled only to an acceptable degree so that it can flow out and a fill level in the irrigation chamber is maintained which corresponds to the height of the overflow. If the irrigation chambers of all plant carriers are then filled to a sufficient extent, the inflow of the water can be interrupted and the water can then flow out through the first and second drain paths, wherein the flow of the outflowing water, as stated above, is greatly throttled so that sufficient water is still present in the irrigation chamber for a predetermined time in order to irrigate the plants.

In this case, it is preferable for the first drain path and the second drain path to be separated from the third drain path by a wall that is higher than a height determined by the overflow. The water flowing through the overflow into the third drain path and from there to the drain is therefore not mixed with the water flowing through the first and the second drain paths.

Preferably, the inlet has an inlet pipe with a flow cross section which is interrupted by a baffle plate, wherein the inlet pipe has a pipe wall with at least one exit opening in the area of the baffle plate. An excessively large drop height is also avoided for the inlet. In the case of plant carriers arranged one above the other, the supplied water can only flow from one inlet pipe to the next, but not over the entire height of several plant carriers stacked on top of one another. The water which flows through a plant carrier arranged above in the direction of gravity can flow at most up to the baffle plate in the inlet pipe of the next plant carrier arranged therebelow in the direction of gravity. There, it is deflected and has to flow outward through the exit opening.

In this case, it is preferable for the inlet pipe to have at least one entrance opening in its wall, which is arranged at a predetermined height above a bottom of an inlet chamber. The water emerging from the outlet opening of the inlet pipe can then enter the inlet pipe again through the entrance opening and then flow further downward through the inlet pipe in order to supply water to a plant carrier arranged further down in the direction of gravity. The height of the inlet opening, that is to say the distance of the entrance opening from the bottom of the inlet chamber, then determines the fill level in the inlet chamber.

Preferably, the inflow chamber is separated from the irrigation chamber by a partition which has at least one throughflow opening. The partition prevents plant residue, torn-off roots, contaminants, or the like from entering the inlet chamber from the irrigation chamber and then being washed with another plant carrier. Although such a passage through the throughflow opening is not completely ruled out, it is very improbable because a flow from the inlet chamber to the irrigation chamber is produced in the throughflow opening.

Preferably, the throughflow opening adjoins the bottom of the irrigation chamber. The throughflow opening is therefore arranged quasi "below", which minimizes the risk of contamination, plant residue, or the like in the event of penetration.

Preferably, the inlet and the drain are arranged at the same edge of the irrigation chamber. This simplifies the design especially when the plant carrier is to be arranged in a block storage arrangement.

Embodiments are directed to a plant carrier that includes an irrigation chamber, an inlet, and a drain which has a drain path arrangement. The drain path arrangement has a first drain path with a first flow direction and a second drain path with at least one outlet into the first drainage path and, in a region of the at least one outlet, a second flow direction of the second drain path has a directional component opposing first flow direction.

According to embodiments, the at least on outlet of the second drain path can include at least five outlets into the first drain path.

In accordance with embodiments, the first drain path may have at least one first section and a second section which are connected in series and arranged next to one another. Moreover, the first drain path can have an odd number of sections that are connected in series and arranged next to one another.

In embodiments, the drain can have a drainage opening that is connected to the drain path arrangement via a baffle plate device. The baffle plate device may have a baffle plate that is directed upward in the direction of gravity and a surface that merges into a wall of a first channel, and the drain path arrangement may be connected to a second channel via at least one opening of the baffle plate device. The first channel and the second channel can lead into or extend through the drainage opening. The baffle plate device may be oriented along a direction of gravity with the drainage opening. Further, the baffle plate device can be connected to a pipe directed upward in the direction of gravity.

According to other embodiments, a third drain path may be provided, which is connected to the irrigation chamber via an overflow. The first drain path and the second drain path can be separated from the third drain path by a wall which is higher than a height determined by the overflow.

In other embodiments, the inlet can have an inlet pipe with a flow cross section which is interrupted by a baffle. The inlet pipe may have a pipe wall with at least one exit opening in a region of the baffle. Moreover, the inlet pipe can have at least one entry opening in the pipe wall which is arranged at a predetermined height above a bottom of an inlet chamber. The inlet chamber may be separated from the irrigation chamber by a partition having at least one throughflow opening. Still further, the at least one throughflow opening may adjoin a bottom of the irrigation chamber.

In accordance with still yet other embodiments, the inlet and the drain can be arranged at a same edge of the irrigation chamber.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. The following are shown therein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
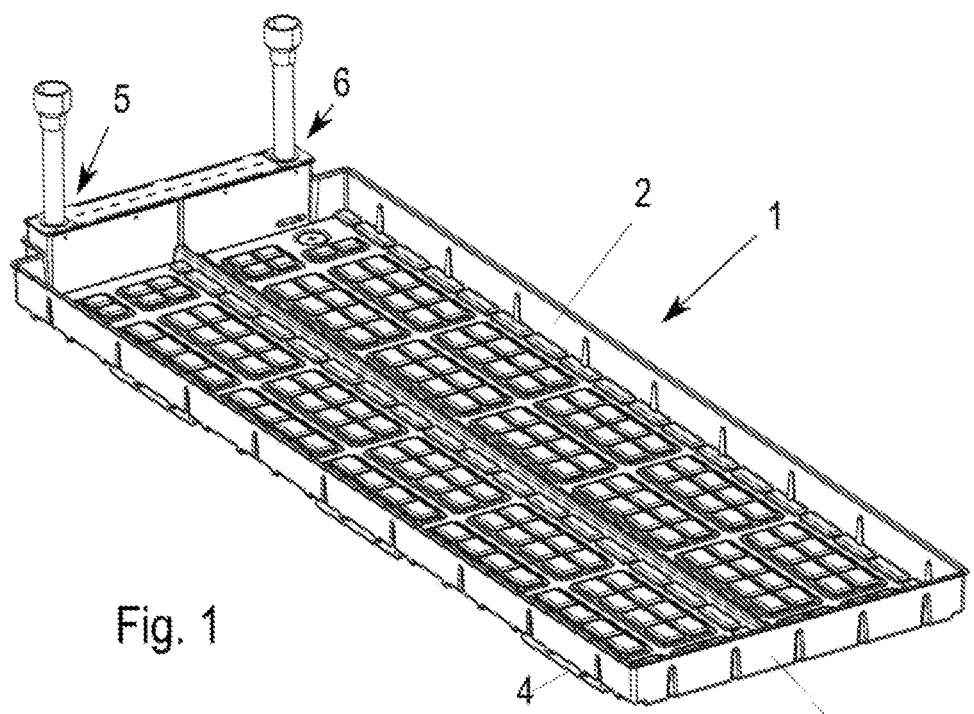
FIG. 1 shows a plant carrier.

FIG. 1 shows a plant carrier 1 which can also be referred to as a "bench". The plant carrier 1 has an irrigation chamber 2 which is surrounded by a wall 3. The irrigation chamber 2 is used to accommodate plants which are arranged on a substrate, e.g., a nonwoven material or the like. The plants can grow from an early stage, such as seeds or seedlings, to an adult plant to then be harvested.

The plant carrier 1 is provided in particular to be used in a block storage or a stack storage arrangement. In this case, a plurality of plant carriers 1 are arranged one above the other in the direction of gravity. The plant carriers 1 then have spacers not shown in more detail which are provided with mutually suitable geometries so that a stack of a plurality of plant carriers 1 can be arranged in the block storage. The plant carriers 1 also have on their side that is lower in the direction of gravity a running rail 4 and, if appropriate, an illumination device not shown, by which plants can be illuminated in a plant carrier arranged below the respective plant carrier in the direction of gravity.

For their growth, plants require liquid which is generally referred to in the following as "water". The water usually also transports nutrients to the plants.

In order to ensure the supply of water, the plant carrier 1 has an inlet 5 and a drain 6. The inlet 5 and drain 6 are shown enlarged in FIG. 2. The drain 6 is explained in more detail in conjunction with FIGS. 3 to 6. The inlet 5 is explained in more detail in conjunction with FIGS. 7 to 10.

The inlet 5 has an inlet chamber 7 which is separated from the irrigation chamber 2 by a wall 8. The irrigation chamber 2 has a bottom 9. In the region of the bottom 9, the wall 8 has a plurality of openings 10 through which water can flow from the inlet chamber 7 into the irrigation chamber 2. The wall 8 is shown here as partially open in order to show an inlet pipe 11, which will be explained later. The inlet pipe 11 is connected to a pipe 12 that projects upward in the direction of gravity. Said pipe 12 is provided in order to allow water to flow into the plant carrier 1 from a plant carrier arranged above the plant carrier 1 in the direction of gravity. The pipe 12 can have a sleeve 13 at its upper end in the direction of gravity into which a lower end 14 of the inlet pipe 11 (FIG. 9) of an additional plant carrier arranged above the plant carrier 1 in the direction of gravity can enter.

Figure 3:
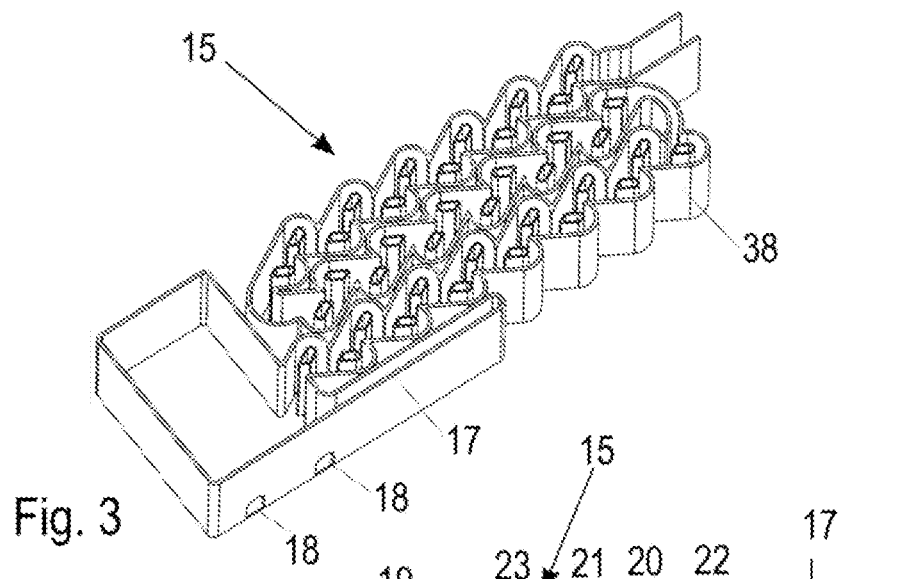
FIG. 3 is a schematic representation of a drain path arrangement.
Figure 4:
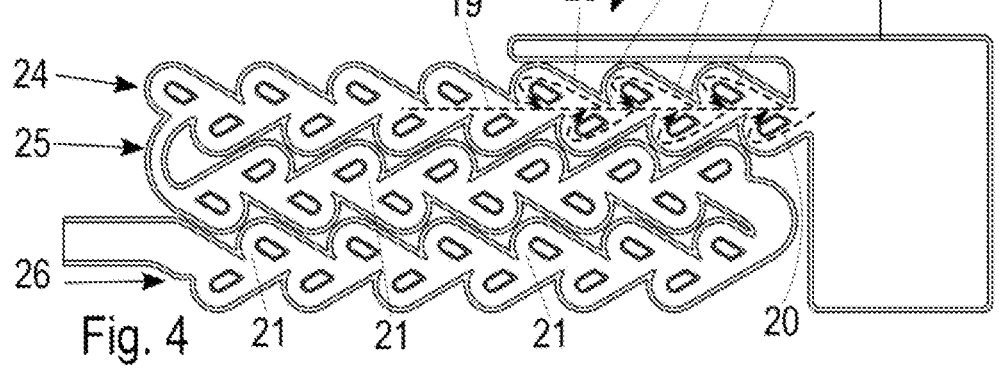
FIG. 4 is a plan view of the drain path arrangement.
Figure 5:
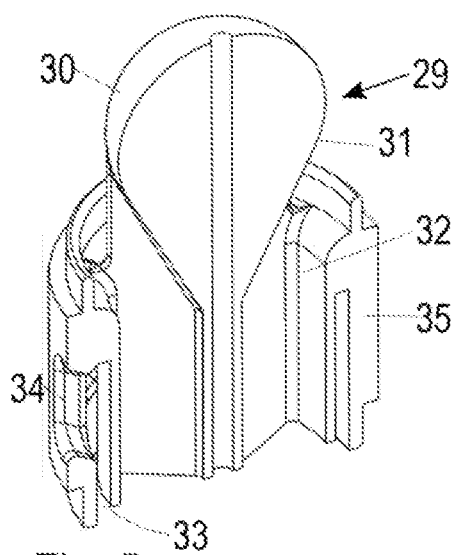
FIG. 5 shows a perspective view of a baffle plate device, partially in section.
Figure 6:
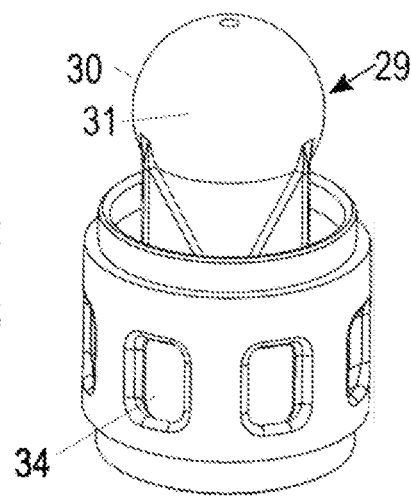
FIG. 6 shows the baffle plate device in a perspective view.
Figure 7:
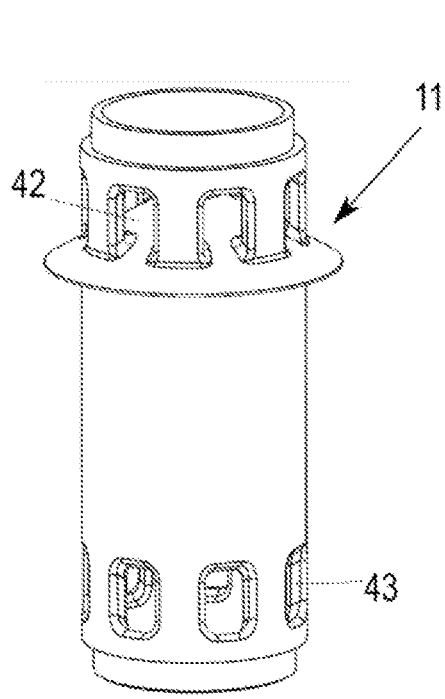
FIG. 7 is a schematic representation of an inlet pipe.
Figure 8:
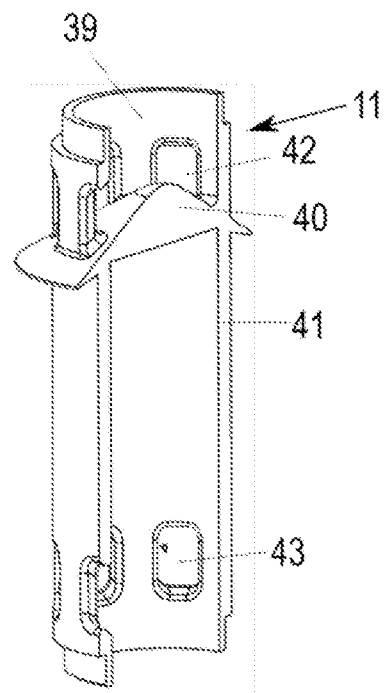
FIG. 8 shows the inlet pipe according to FIG. 7, partially in section.
Figure 9:
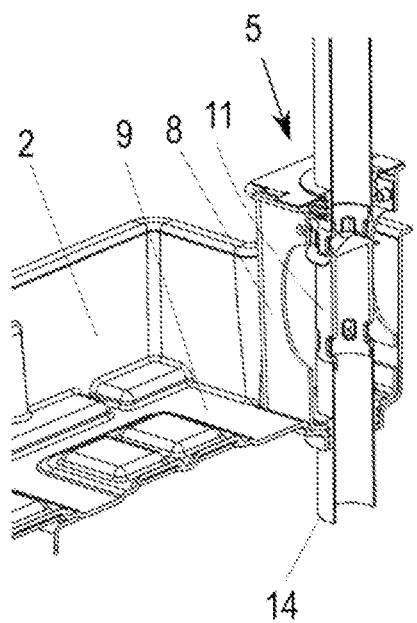
FIG. 9 is a perspective view, partially in section, of the inlet.

The drain 6 has a drain path arrangement 15, which is shown in more detail in conjunction with FIGS. 3 and 4. The drain path arrangement 15 is arranged in a drain chamber 16, which is separated from the irrigation chamber 2 by a wall 17. The wall 17 has a plurality of openings 18 in the region of the bottom 9 of the irrigation chamber 2. Furthermore, the wall 17 has an overflow 44, which can also be designed as an opening, for example.

The drain path arrangement 15 has a first drain path 19, the beginning of which is shown in dashed lines in FIG. 4. In the first drain path 19, the water can flow with a flow direction which is directed from right to left in the region shown in dashed lines in FIG. 4. Furthermore, the drain path arrangement 15 has a second drain path 20, in which the outflowing water is guided in an arc and which leads with an outlet 21 into the first drain path 19. In the region of the outlet 21, the water flowing through the second drain path 20 has a flow direction with a component which is directed opposite to the flow direction in the first drain path 19.

The first drain path 19 and the second drain path 20 are separated from one another by bafflers 22. The second drain path 20 has a guide wall 23 which faces away from the first drain path 19 and has a straight section and a curved section which has an angle of curvature in the range of 150 to 180°.

The first drain path 19 has a first section 24, a second section 25, and a third section 26. The three sections 24-26 are connected in series in the flow direction, which is to say arranged one behind the other. However, the three sections 24-26 are arranged next to one another so that the water flowing through the first drainage path 19 must undertake a change in direction by approximately 180° twice in order to be able to flow through the drain path arrangement 15 completely. In the second section 25 and in the third section 26, outlets 21 are also provided so that a throttling of the flow of the outflowing water can also be achieved in the second section 25 and in the third section 26, wherein this throttling, which is to say a slowing of the flow rate, is not caused by a cross-sectional narrowing. In contrast, the cross sections can be selected to be relatively large. This also applies to the size of the openings 18 in the wall 17. This prevents the risk of the drain being clogged by plant residue, such as broken-off roots or the like, or by dirt particles.

The second drain path 22 is also arranged in parallel with the first drain path 19 in the second section 24 and in the third section 25 and can accordingly have a decelerating effect over the entire flow length of the drain path arrangement 15. A very slow outflow of the water from the irrigation chamber 2 can thus be ensured, without valves being required for this purpose. The time that the water needs to flow completely out of the irrigation chamber 2 can be adjusted relatively precisely by appropriate dimensioning of the drain path arrangement 15.

Figure 10:
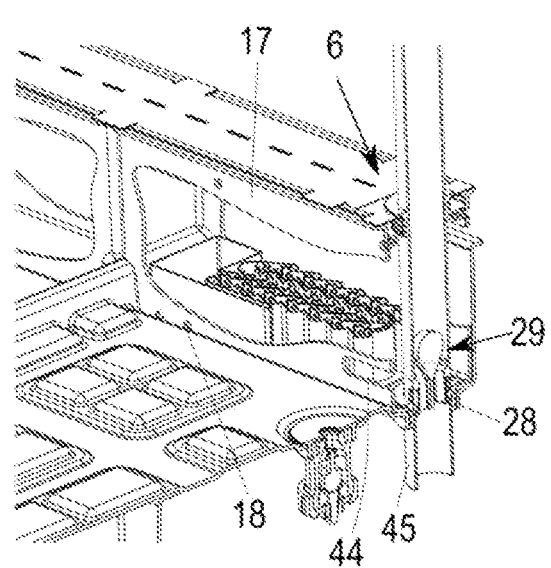
FIG. 10 is a perspective view, partially in section, of the drain.

As can be seen in particular in FIG. 10, the drain 6 has a drain opening 28 which is formed in the bottom 9 of the irrigation chamber 2. A baffle plate device 29, which is connected to the drain path arrangement 15, is arranged in the drain opening 28. The baffle plate arrangement 29 has a baffle plate 30, the surface 31 of which is connected to a first channel 32 which passes through the drain opening 28. Water that flows out of a plant carrier arranged further upward in the direction of gravity then strikes the baffle plate 30 and flows further downward through the first channel 32, for example, to a plant carrier arranged further down.

The baffle plate device has a second channel 33, which is connected to the drain path arrangement 15 via an opening 34 in a wall 35 of the baffle device 29. Water flowing through the drain path arrangement 15 enters the second channel 33 through the opening 34 and can then also flow out downward to a plant carrier arranged further down in the direction of gravity. The water from the current plant carrier 1 therefore does not mix in the plant carrier 1 with water from a plant carrier lying there above.

The baffle plate device 29 is connected to a pipe 36 which is directed upward in the direction of gravity and also has a sleeve 37 at its upper end in the direction of gravity, into which sleeve a pipe 45 connected to the baffle plate device 29 can enter in order to divert the water flowing out of the plant carrier 1 to the next lower plant carrier.

Water Which flows through the overflow 44 in the wall 17 can also flow directly through the openings 34 in the baffle plate device 29. For this purpose, a third drain path is provided which is separated from the first drain path 19 and from the second drain path 20, specifically by a wall 38 which is higher than a height determined by the overflow 44. The wall 38 therefore has a height that is greater than a distance between the lower edge of the overflow 44 and the bottom 9 of the irrigation chamber 2.

As mentioned above, the inlet pipe 11 is arranged in the inlet 5. The inlet pipe 11 has a flow cross section 39 that is interrupted by a baffle plate 40. In order to allow water flowing out of an upper plant carrier in the direction of gravity to flow downward into the inlet chamber 7, a wall 41 of the inlet pipe 11 has a plurality of exit openings 42 through which the water can flow into the inlet chamber 7. The level of the water in the inflow chamber 7 then rises until the water can enter the inlet pipe 11 again through entry openings 43. The height of the water level is determined by the distance of the respectively lower edge of the entry opening 43 from the bottom of the inflow chamber 2. The bottom of the inflow chamber 7 normally corresponds to the bottom 9 of the irrigation chamber 2.

The flow resistance to which the water is exposed through the exit openings 42 of the inlet pipe 11 and through the openings 10 in the wall 8 between the inlet chamber 7 and the irrigation chamber 2 is significantly smaller than the flow resistance that the drain path arrangement 15 generates.

This arrangement makes it possible to control the irrigation of plants which are arranged in the plant carrier 1 without using valves on the plant carrier 1 in a simple manner.

In order to initiate the watering, water is fed through the inlet 5. The water flows through the pipe 12 and reaches the inlet pipe 11 and from there into the feed chamber 7. The water then flows through the openings 10 into the irrigation chamber 2 and, when it reaches the entry openings 43, also into a plant carrier which is arranged further down. Therefore, depending on the number of plant carriers 1 to be filled, a relatively large volume flow can be fed into the pipe 12 of the uppermost plant carrier 1. The irrigation chamber 2 cannot be overfilled because the fill level in the irrigation chamber 2 can never be greater than the level of the water in the inlet chamber 7, which in turn is determined by the entry openings 43.

The water that has entered the irrigation chamber 2 through the openings 10 then flows up to the wall 17 and from there through the openings 18 in the wall 17 into the drainage chamber 16. However, the outflowing water is decelerated by the drain path arrangement 15 so that it accumulates in the irrigation chamber 2 until it reaches the overflow 44. The water cannot rise in the irrigation chamber 2. Water which enters the drainage chamber 16 via the overflow 44 can flow out directly through the baffle plate device 9.

If all plant carriers 1 in a stack have been sufficiently supplied with water, the water supply is simply interrupted. The water in the irrigation chamber 2 can then flow out, but only very slowly because a considerable throttling effect on the water is exerted by the drain path arrangement 15. As stated above, the time required by the water volume in the irrigation chamber 2 to exit through the drain path arrangement 15 can be adjusted relatively accurately. It is thus possible to determine how long the plants or the roots of the plants can benefit from the water in the irrigation chamber 2.

Figure 2:
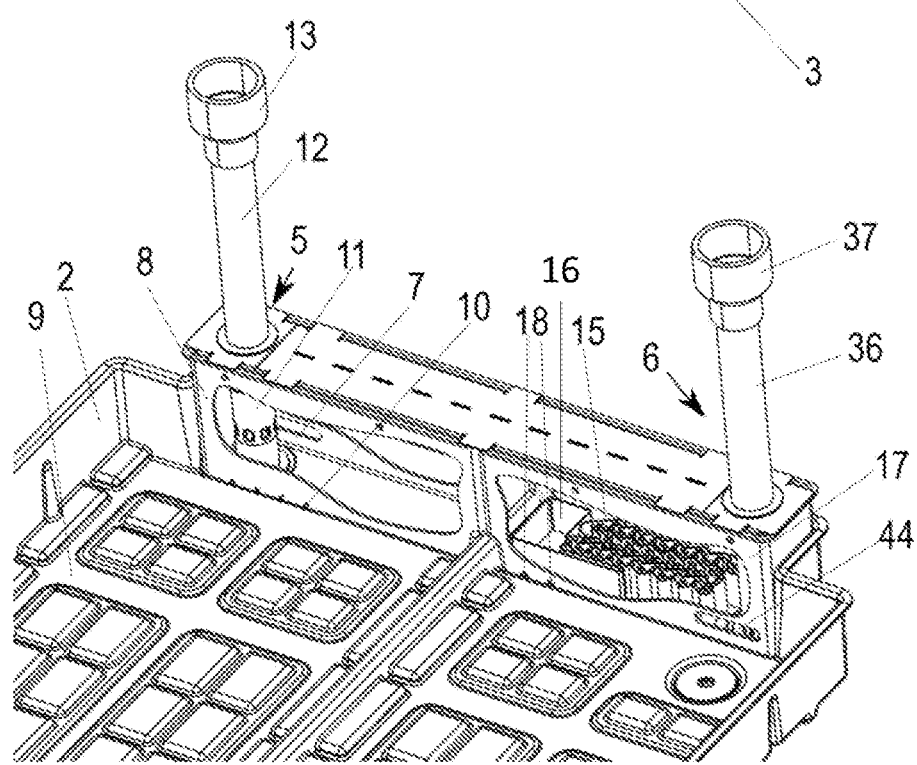
FIG. 2 shows an end of the plant carrier with an inlet and drain in an enlarged representation.

As can be seen in FIGS. 1 and 2, the inlet 5 and the drain 6 are arranged at the same edge of the irrigation chamber 2. Accordingly, all elements required for the water supply of the irrigation chamber 2 can be accommodated in the region of an edge.

As can be seen in FIGS. 3 and 4, the second drain path 20 is connected to the first drain path 19 via a large number of outlets 21. Expediently, at least five openings 21 are used.

Three sections 24-26 of the first drain path 19 are shown. It is useful to use an odd number of sections so that the water can enter at one end of the drain path arrangement 15 and exit at the opposite end of the drain path arrangement 15.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A plant carrier comprising:
  an irrigation chamber having a bottom wall and enclosed by at least one sidewall;
  an inlet chamber separated from the irrigation chamber by a wall extending perpendicular to the bottom wall and having at last one opening formed in a region of a bottom of the irrigation chamber; wherein water flows from the inlet chamber into the irrigation chamber;

a drain chamber separated from the irrigation chamber by a wall having at least one opening formed in a region of a bottom of the irrigation chamber and an overflow opening arranged at a height above the at least one opening; wherein water flows from the irrigation chamber into the drain chamber; the drain chamber having a drain which has a drain path arrangement, wherein the drain path arrangement has a first drain path with a first flow direction and a second drain path with at least one outlet into the first drainage path and, in a region of the at least one outlet, a second flow direction of the second drain path has a directional component opposing the first flow direction; wherein the first drain path and the second drain path are separated by a series of spaced bafflers; and wherein the first drain path has at least one first section and a second section which are connected in series and arranged next to one another.

2. The plant carrier according to claim 1, wherein the at least one outlet of the second drain path comprise has at least five outlets into the first drain path.

3. The plant carrier according to claim 1, wherein the first drain path has an odd number of sections that are connected in series and arranged next to one another.

4. The plant carrier according to claim 1, wherein the drain has a drainage opening that is connected to the drain path arrangement via a baffle plate device, wherein the baffle plate device has a baffle plate that is directed upward in a direction of gravity and a surface that merges into a wall of a first channel, and wherein the drain path arrangement is connected to a second channel via at least one opening of the baffle plate device and the first channel and the second channel lead into or extend through the drainage opening.

5. The plant carrier according to claim 4, wherein the baffle plate device is oriented along the direction of gravity with the drainage opening.

6. The plant carrier according to claim 4, wherein the baffle plate device is connected to a pipe directed upward in the direction of gravity.

7. The plant carrier according to claim 1, wherein a third drain path is provided, which is connected to the irrigation chamber via the overflow opening.

8. The plant carrier according to claim 7, wherein the first drain path and the second drain path are separated from the third drain path by a wall which is higher than a height determined by the overflow opening.

9. The plant carrier according to claim 1, wherein the inlet has an inlet pipe with a flow cross section which is interrupted by a baffle, wherein the inlet pipe has a pipe wall with at least one exit opening in a region of the baffle.

10. The plant carrier according to claim 9, wherein the inlet pipe has at least one entry opening in the pipe wall which is arranged at a predetermined height above a bottom of the inlet chamber.

11. The plant carrier according to claim 1, wherein the inlet and the drain are arranged at a same edge of the irrigation chamber.

12. The plant carrier according to claim 1, wherein the drain chamber includes an open tank, the open tank being in fluid communication with the irrigation chamber via at least one opening and in fluid communication with the drain via the drain arrangement.

* * * * *